US010239494B2

(12) United States Patent
Spiess

(10) Patent No.: US 10,239,494 B2
(45) Date of Patent: Mar. 26, 2019

(54) SECURE VEHICLE ACCESS SYSTEM, KEY, VEHICLE AND METHOD THEREFOR

(71) Applicant: NXP B.V.

(72) Inventor: Bernhard Spiess, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/841,025

(22) Filed: Dec. 13, 2017

(65) Prior Publication Data

US 2018/0162321 A1 Jun. 14, 2018

(30) Foreign Application Priority Data

Dec. 14, 2016 (EP) ..................................... 16204043

(51) Int. Cl.
  *H04M 1/60* (2006.01)
  *B60R 25/24* (2013.01)
  *G07C 9/00* (2006.01)
  *H04B 1/69* (2011.01)

(52) U.S. Cl.
  CPC ........ *B60R 25/246* (2013.01); *G07C 9/00119* (2013.01); *G07C 9/00309* (2013.01); *B60R 2325/103* (2013.01); *G07C 2009/00357* (2013.01); *G07C 2009/00555* (2013.01); *G07C 2209/63* (2013.01); *H04B 1/69* (2013.01)

(58) Field of Classification Search
  None
  See application file for complete search history.

(56) References Cited

U.S. PATENT DOCUMENTS

| 7,580,521 | B1 * | 8/2009 | Spies | H04L 9/3073 380/281 |
| 8,907,760 | B2 * | 12/2014 | Nowottnick | G06K 19/07767 340/5.2 |
| 8,965,287 | B2 * | 2/2015 | Lam | G07C 9/00309 455/41.2 |
| 9,563,990 | B2 * | 2/2017 | Khan | G07C 9/00309 |
| 2014/0285319 | A1 * | 9/2014 | Khan | G07C 9/00309 340/5.61 |

FOREIGN PATENT DOCUMENTS

| EP | 2 514 643 A2 | 10/2012 |
| EP | 2 813 963 A1 | 12/2014 |
| EP | 3 054 315 A1 | 8/2016 |
| GB | 2496755 A | 5/2013 |
| GB | 2505287 A | 2/2014 |
| WO | 2012/017214 A1 | 2/2012 |
| WO | 2014/191551 A1 | 12/2014 |
| WO | 2016/059451 A1 | 4/2016 |

* cited by examiner

*Primary Examiner* — K. Wong
(74) *Attorney, Agent, or Firm* — Rajeev Madnawat

(57) ABSTRACT

A secure vehicle access system comprises a vehicle and a key associated with the vehicle. The key comprises: a radio frequency, RF, key transceiver configured to: broadcast at least one signal; and listen for an acknowledgement message from the vehicle. The vehicle comprises: a radio frequency, RF, vehicle transceiver configured to: listen for the at least one broadcast signal from the key; and in response thereto, transmit an acknowledgement message back to the key to establish a communication link between the vehicle and the key. The key further comprises a ranging circuit configured to perform a distance determination between the vehicle and the key, following the establishment of the communication link, to determine whether to allow access to the vehicle.

15 Claims, 7 Drawing Sheets

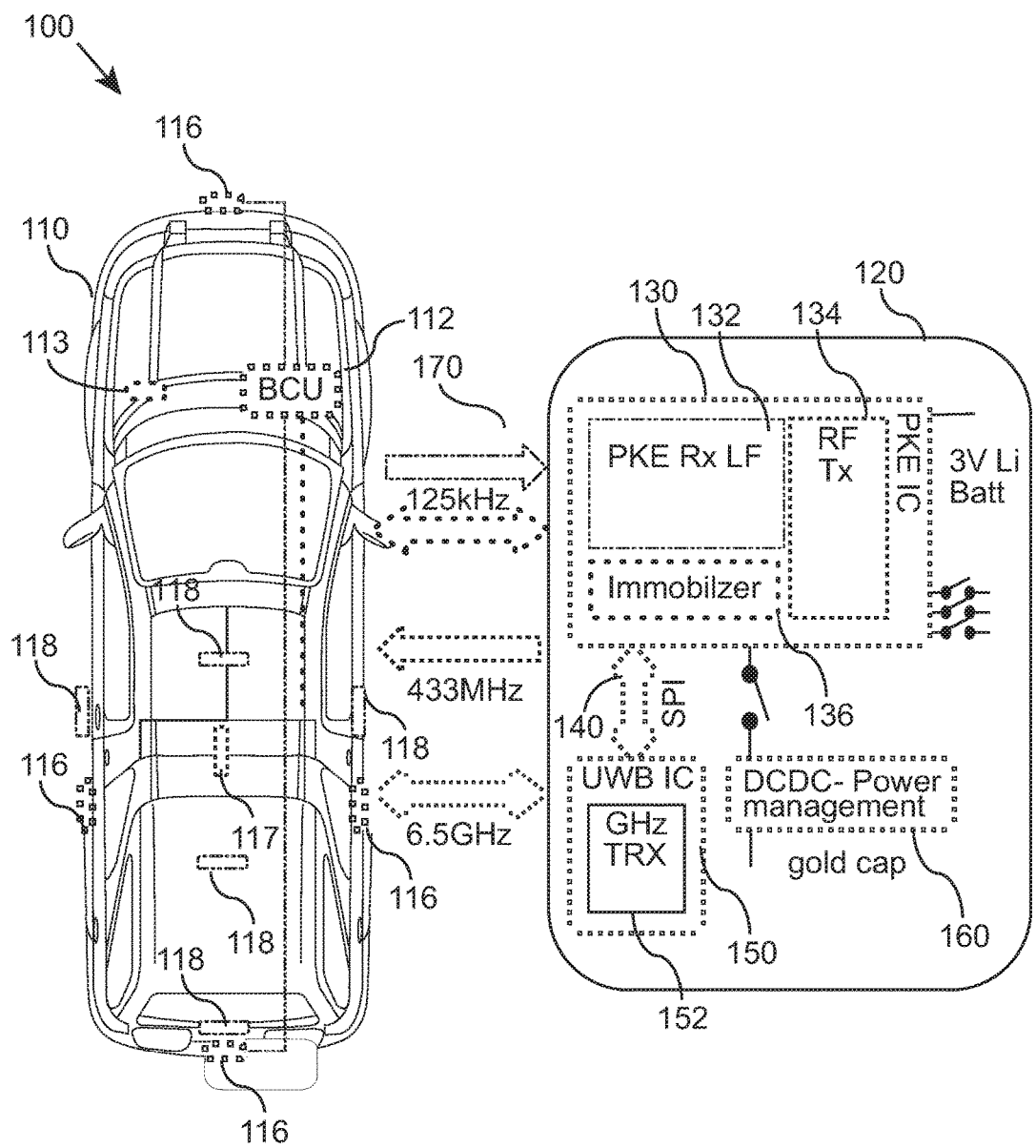
FIG. 1 – Prior Art

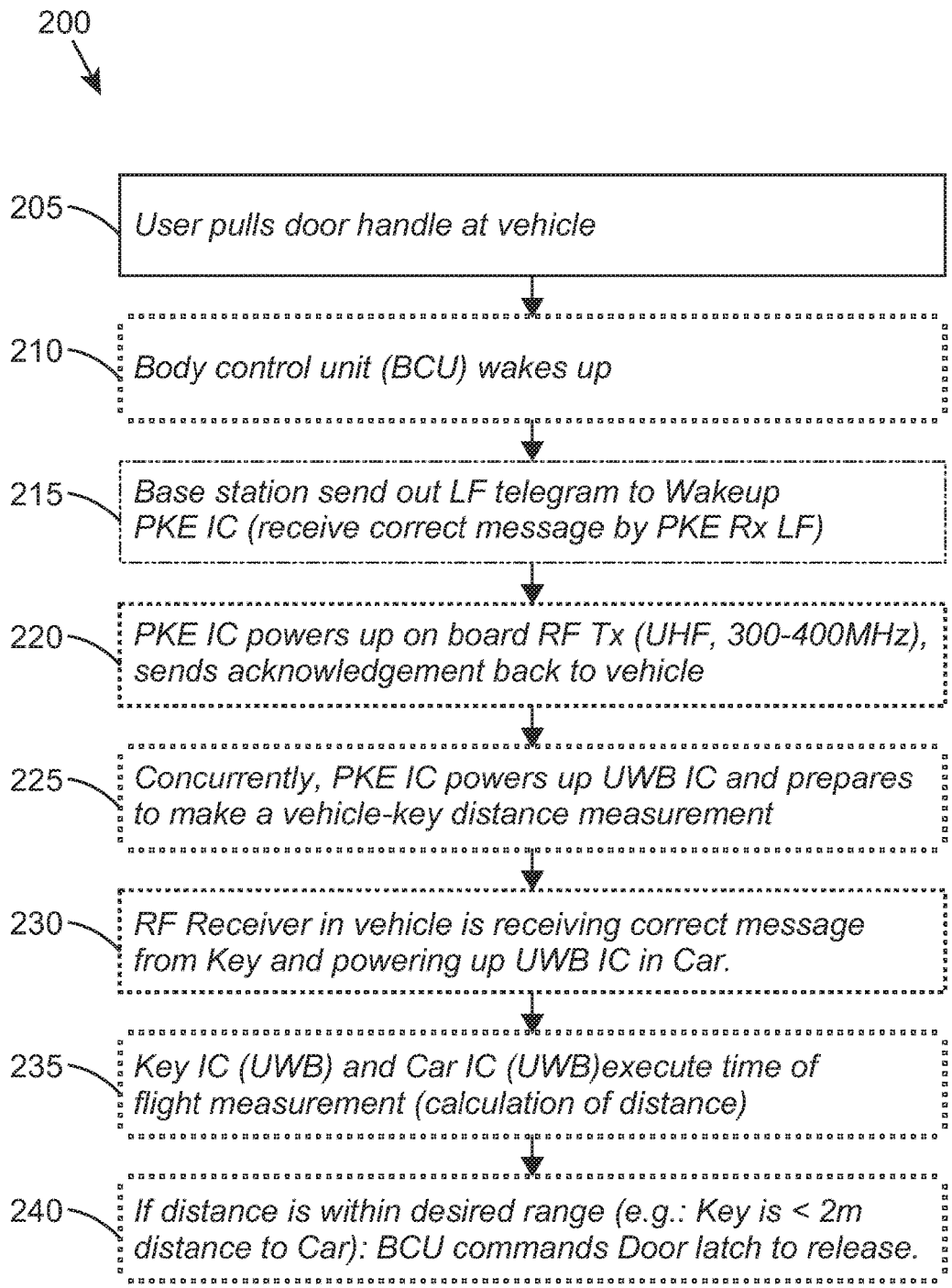
FIG. 2 – Prior Art

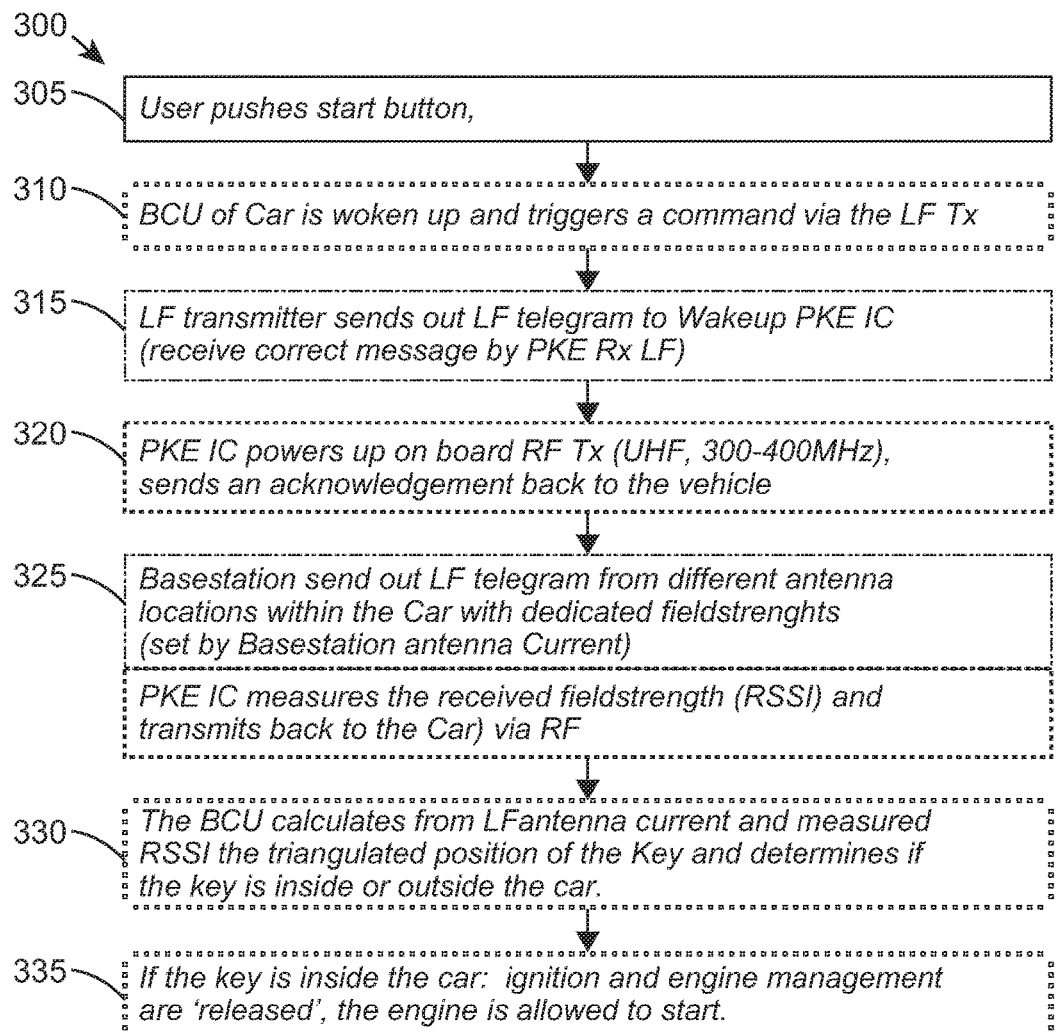
FIG. 3 – Prior Art
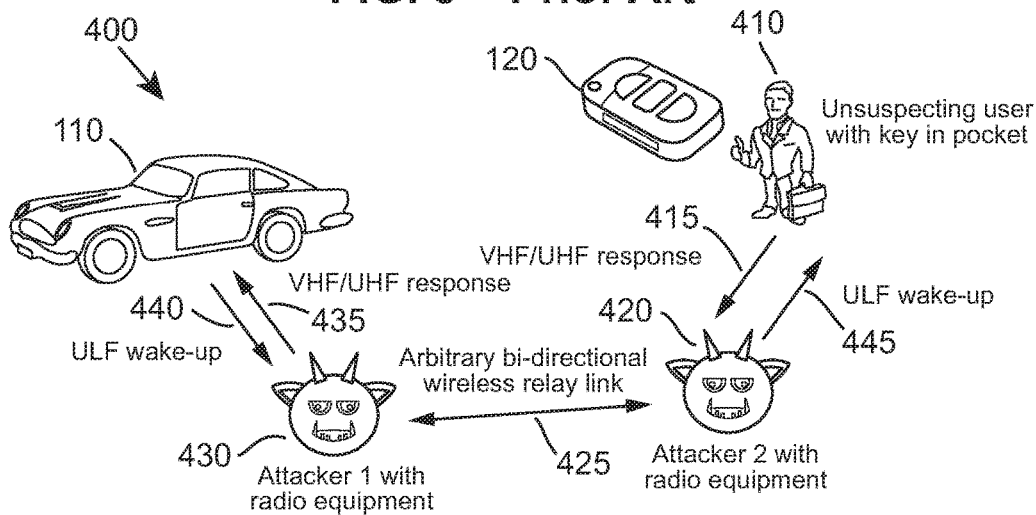
FIG. 4 – Prior Art

SECURE VEHICLE ACCESS SYSTEM, KEY, VEHICLE AND METHOD THEREFOR

CROSS-REFERENCE TO RELATED APPLICATIONS

This application claims the priority under 35 U.S.C. § 119 of European Patent application no. 16204043.0, filed on Dec. 14, 2016, the contents of which are incorporated by reference herein.

FIELD OF THE INVENTION

The field of this invention relates to a secure vehicle access system, a key, a vehicle and a method therefor. The invention is applicable to, but not limited to, a passive keyless entry (PKE) vehicle access system.

BACKGROUND OF THE INVENTION

Passive keyless entry is a generic term for an automotive technology that allows a vehicle driver to lock and unlock a vehicle without using the corresponding SmartKey buttons. Once a driver enters a vehicle with an equipped Keyless Go SmartKey or Keyless Go wallet size card, they have the ability to start and stop the engine, without inserting the SmartKey (i.e. ignition key). A transponder built within the SmartKey allows the vehicle to identify a driver. In some cases, an additional safety feature is integrated into the vehicle, making it impossible to lock a SmartKey that has a Keyless Go feature inside a vehicle. After a few years on the market, this technology is being used ever more extensively, evolving down from luxury car manufacturers to some economy car brands.

Referring now to FIG. 1, a simplified block diagram of a known PKE system 100 is illustrated. The passive keyless entry system 100 includes a vehicle 110 that has a number of vehicle access and security control and communication points. The vehicle access and security control and communication points include a radio frequency (RF) receiver 117, a number of ultra-wideband (UWB) communication transceivers 116 (where UWB is a radio technology that can use a very low energy level for short-range, high-bandwidth communications over a large portion of the radio spectrum), and a low frequency (LF, e.g. 125 kHz) transmitter with several antennas 118. The vehicle also includes an immobilizer point 113. A body control unit (BCU) 112 is located in the vehicle and is arranged to control communications to an external, removable associated vehicle key 120.

The key 120 includes a PKE integrated circuit (IC) 130, which is typically powered by a 3V Li battery and includes a PKE LF receiver (RX) IC 132, a radio frequency (RF) transmitter (Tx) IC 134 and an immobilizer IC 136. The key 120 also includes a UWB IC 150 that includes a transceiver (TRX) IC 152 that is configured to operate in the GHz frequency range and is coupled to the PKE IC via a serial-parallel interface 140. Typically, the key 120 will also include a DC-DC power management circuit 160.

The PKE system 100 works by having a series of low frequency (LF, e.g. 125 kHz) antennas 118, located both inside and outside the vehicle. The external antennas are typically located in the door handles. When the handle is pressed, an LF signal is transmitted from the LF transmitter via the LF antennas 118 to the key 120. In this manner, the key 120 becomes activated by a person pulling or touching the vehicle door handle, lithe key 120 is located sufficiently close to the vehicle 110. This location is done via measurement of the received signal strength in the PKE LF receiver 132 and knowledge of the magnetic field strength generated by the LF antennas 118. The key 120 transmits its identifier (ID) back to the vehicle 110 via RF, e.g. >300 MHz, to the RF receiver 117 located in the vehicle 110. If the key 120 has the correct ID, a PKE module (not shown) located inside the vehicle unlocks the vehicle 110.

It is important that the vehicle cannot be started when the user/driver, and therefore the smart key, is away from the vehicle. This is especially important at, say, fuelling stations where the user is outside of, but very close to, the vehicle and is likely to be sufficiently close for the unlocking and automatic vehicle starting processes to work.

Known countermeasures to prevent a thief accessing the car in such a situation include the addition of a precise distance measuring operation (e.g. a time-of-flight measurement via ultra-wideband (UWB) infra-red (IR) or RF means) in order to overcome this problem of a user and the key being located external to, but near, the vehicle. Such a distance measuring operation approach introduces complexity and high cost, since the existing PKE system 110 (of a LF transmitter, with multiple LF antennas 118 in the car plus a PKE LF receiver 132 in the key 120 (in order to comply with ultra-low power consumption) is maintained, but additional distance measuring circuit is added.

Referring now to FIG. 2, a flowchart 200 of a known opening a car that employs a PKE system, such as the PKE system of FIG. 1, is illustrated. At 205, the user pulls the vehicle door handle. In response, at 210, the ECU of the vehicle, such as ECU 112 of FIG. 1, is woken up. The waking up of the ECU triggers, at 215, a LF transmission (sometimes referred to as a 'PKE telegram') to wake up the PKE IC, such as PKE IC 130, of the key 120 of FIG. 1 (which checks, in PKE Rx LF 132 of FIG. 1, as to whether it has received a correct message from the associated vehicle 110). At 220, the key's PKE IC powers up the on-board RF transmitter (e.g. UHF, 300-400 MHz), and sends an acknowledgement message back to the vehicle 110.

Concurrently, at 225, the PKE IC powers up the key's UWB IC and prepares to respond to a distance measurement, e.g. a so-called 'time-of-flight' measurement. At 230, the RF receiver 117 in the vehicle 110 receives and identifies the correct acknowledgement message from the key 120 and powers up the UWB circuits in the vehicle 110. At 235, the key UWB IC and the vehicle UWB IC execute a distance (e.g. time-of-flight) measurement in order to calculate a distance between the vehicle and the key. At 240, if the determined distance is within a desired range (e.g.: the key 120 is within, say, 2 m distance to the vehicle 110), the ECU 112 commands the vehicle door latch to release.

Referring now to FIG. 3, a flowchart 300 of a known starting of a vehicle that employs a PKE system, such as the PKE system 100 of FIG. 1, is illustrated. In this regard, the vehicle must be able to determine if the vehicle's key is located within or outside the vehicle. At 305 the user/vehicle driver pushes the start button, and in response, at 310, the BCU 112 of the vehicle is woken up. The waking up of the ECU at 310 triggers, at 315, a LF transmission (sometimes referred to as a 'PKE telegram') to wake up the PKE IC, such as PKE IC 130 of the key 120 of FIG. 1 (which checks, in PKE Rx LF 132 of FIG. 1, as to whether it has received a correct message from the associated vehicle 110). At 320, the key's PKE IC powers up the on-board RF transmitter (e.g. UHF, 300-400 MHz), and sends an acknowledgement message back to the vehicle 110. At 325, the vehicle LF transmitter sends out an LF telegram from different locations of the LF antennas 118 within the vehicle, with dedicated field strengths. Concurrently, the key's PKE IC measures the received field strength indication (RSSI) and transmits this measurement back to the vehicle via the key's RF transmitter. At 330, the vehicle BCU 112 calculates from the vehicle LF transmitter antenna current, and the measured and reported RSSI, a triangulated position of the key 120. From this calculation, the ECU 112 is able to determine whether (or not) the key 120 is located inside or outside of the vehicle 110. At 335, if the key is located inside the vehicle 110, the ignition and engine management functions are 'released', and the engine is allowed to start.

It is known that today's PKE systems suffer from relay station attacks (RSAs) where the communication between a car and a car key may be intercepted and relayed (lengthened) by an unauthorised person (e.g. a thief), in order to unlock or start a car without notifying the key holder. The unauthorised person attempts to gain access to a target car by making the vehicle believe that a legitimate, registered key is within the vicinity of the car, when actually it is not. This is attempted by relaying back and forth the messages between the car and the key sent on LF and RF frequencies, respectively. In order for this type of attack to succeed the unauthorised person has to be within the vicinity of the car and, from a reasonable distance, has to have wireless, remote access to a legitimate key, which will typically be outside of the 'vicinity' range of the car.

Often, two relay stations will be needed to achieve this unauthorised access and/or vehicle start, as illustrated in the example 400 of a known relay attack of a vehicle 110 that employs a PKE system of FIG. 4. A first relay station 430 is located near the vehicle 110 and the second relay station 420 is located close to the key 120 or the key holder. The unauthorised person touches the door of the vehicle 110, which sends a LF wake up message 440. This is picked up by the first relay station 430 and routed via a bi-directional wireless relay link 425 to the second relay station 420. The second relay station 420 routes the LF wake up message 445 to an unsuspecting key holder 410 that has the key 120, which responds with the authentic RF response 415. The second relay station 420 routes the authentic RF response via the bi-directional wireless relay link 425 to the first relay station 430, which sends the authentic RF response 435 to the vehicle 110 to unlock it.

In this manner, it appears to the vehicle that the vehicle's keyless entry/Go electronic control unit (ECU) and the key 120 are communicating directly with one another over a short distance, i.e. within the a distance threshold of the vehicle, and the vehicle will thereafter execute the desired PKE functions. The unauthorised person does not have to have any knowledge about the protocol data being sent between the two devices, car and key, nor does he require any knowledge of any secret encryption keys or the agreed response to the challenge presented by the car to the key. Also, the owner of the car key is not required to press any buttons. Indeed, the owner may well be completely unaware of the attack being executed, while he or she is in full possession of his or her car key. This security risk is an undesirable consequence of the simplicity of known PKE systems.

SUMMARY OF THE INVENTION

The present invention provides a secure vehicle access system, a key, a vehicle and a method therefor, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like, or functionally similar, elements. Elements in the figures are illustrated for simplicity and clarity purposes only and have not necessarily been drawn to scale.

FIG. 1 illustrates a simplified example block diagram of a known passive keyless entry (PKE) system.

FIG. 2 illustrates a flowchart of a known opening of a car that employs a PKE system.

FIG. 3 illustrates a flowchart of a known starting of a car that employs a PKE system.

FIG. 4 illustrates an example of a known relay station attack of a car that employs a PKE system.

DETAILED DESCRIPTION

Figure 5:
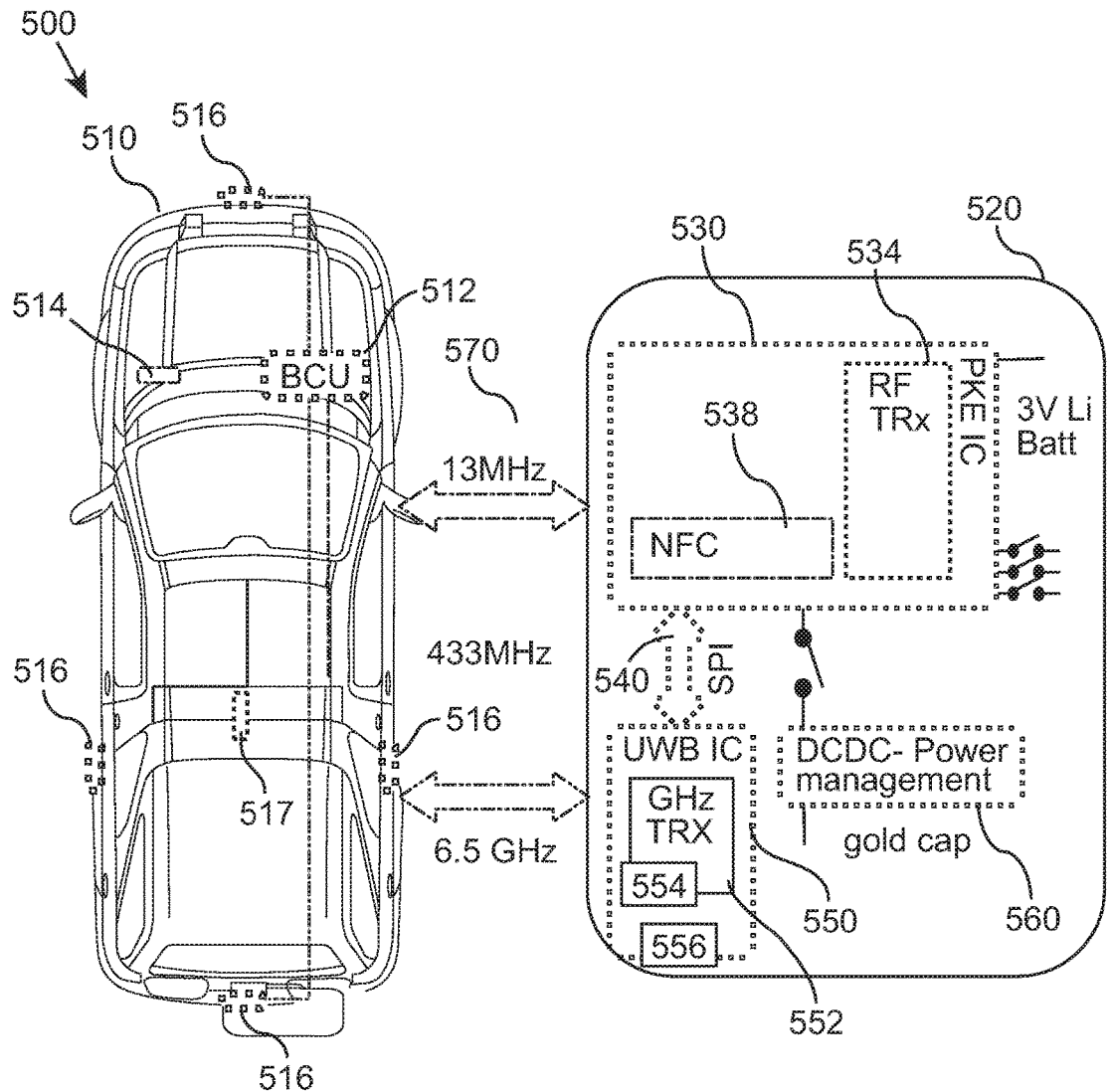
FIG. 5 illustrates a simplified example block diagram of a PKE system, according to example embodiments of the invention.

Examples of the present invention provide a secure vehicle access system, a key, a vehicle and a method therefor, which reverse the known PKE mechanism of the vehicle waking up the key, in that the key is now configured to wake up the vehicle. Furthermore, the example secure vehicle access system, key, vehicle and method therefor removes the need for a costly LF transmission between, and LF circuitry contained in, the vehicle and the key. Additionally, the example secure vehicle access system, key, vehicle and method therefor utilise a combination of a low power wake up RF link with a ultra-wideband (UWB) ranging mechanism performed at the key in order to determine whether (or not) to allow access to the vehicle.

A secure vehicle access system includes a vehicle and a key associated with the vehicle. The key includes a radio frequency (RF) key transceiver configured to broadcast at least one signal and listen for an acknowledgement message from the vehicle. The vehicle includes a RF vehicle transceiver configured to listen for the at least one broadcast signal from the key and in response thereto, transmit an acknowledgement message back to the key to establish a communication link between the vehicle and the key. The key further includes a ranging circuit configured to perform a distance determination between the vehicle and the key, following the establishment of the communication link, to determine whether (or not) to allow access to the vehicle.

In this manner, the described secure vehicle access system, key, vehicle and method therefor may provide a reduced security risk when employing the PKE system, by transferring the decision making circuit that allows access to the vehicle away from the vehicle. In this manner, RSA attacks can be substantially reduced, as the interception of the initial transmission by the key makes it significantly more difficult for a thief located near to the vehicle being able to control the vehicle access communication, not least as the key could be far removed from the vehicle. Advantageously, by employing a time-discontinuous approach to the operation of the key, with respect to a broadcast signal (e.g. an advertising pulse) and short reception windows used for processing response messages to the ranging signal (e.g. time-of-flight challenge message), there is minimal impact on the battery life of the key. Indeed, in most instances, an increased battery life may be achieved.

In some examples, the ranging circuit may be operably coupled to an ultra-wideband, UWB, key transceiver to form a second UWB communication link with the vehicle in order to perform the distance determination. The vehicle may include a number of UWB vehicle transceivers configured to receive a ranging (challenge) signal from the key and transmit an acknowledgement message in response thereto. In some examples, the ranging circuit may perform a time-of-flight measurement for the distance determination. In this manner, the introduction of a time-of-flight constraint on the processing of the ranging message, and the transfer of the decision to the key, means that the ability to access the vehicle when the key is located far away from the vehicle is made significantly more difficult.

In some examples, the broadcast signal may include at least one broadcast advertising pulse or other such very-short, low-power transmission. In some examples, the broadcast signal may be transmitted from the key in a time-discontinuous manner, comprising one of: regular, intermittent or periodic transmissions. In this manner, a significant current (power) reduction in the transmitter side of the communication link between the vehicle and the key may be achieved.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Referring now to FIG. 5, a simplified example block diagram 500 of a PKE system according to example embodiments is illustrated. The PKE system includes a vehicle 510 that has a number of vehicle access and security control and communication points. The vehicle access and security control and communication points include a RF vehicle transceiver 517, a number of ultra-wideband (UWB) communication transceivers 516 configured to use a very low energy level for short-range, high-bandwidth communications over a large portion of the radio spectrum. A body control unit (BCU) 512 is located in the vehicle and controls functions and circuits in the vehicle as well as communications to an external, removable key 520.

The key 520 includes a PKE integrated circuit (IC) 530, which is typically powered by a 3V Li battery, a radio frequency (RF) key transceiver (TRx) IC 534, which according to examples of the invention is arranged to both transmit and receive RF signals. In this example, it is envisaged that the RF TRx IC 534 may utilise Bluetooth Long Term evolution (BLE™) technology at 2.4 GHz. The key 520 also includes a UWB IC 550 that includes a transceiver (TRx) IC 552 that is configured to operate in the GHz frequency range and is coupled to the PKE IC via a serial-parallel interface 540. Typically, the key 520 may also include a DC-DC power management circuit 560.

In accordance with some example embodiments, the secure vehicle access system, such as PKE system 500, includes the key transceiver 534 being configured to broadcast at least one signal, such as an advertising pulse or any other suitable RF signal; and listen for an acknowledgement message from the vehicle 510. The RF vehicle transceiver 517 of the vehicle 510 is configured to listen for the at least one broadcast signal from the key 520; and in response thereto, transmit an acknowledgement message back to the key 520 in order to establish a communication link between the vehicle 510 and the key 520. In some examples, the UWB IC 550 may include, or in alternative examples be operably coupled to, a processor circuit 556 arranged to process the received acknowledgement message and determine therefrom that the acknowledgement message was sent from the vehicle 510 associated with the key 520. In some examples, cryptography measures, such as challenge response authentication or mutual authentication, may be applied in order to secure the correctness of the acknowledgement.

In accordance with some example embodiments, the key 520 further comprises a ranging circuit 554, which in this example is included within (or coupled to) the UWB IC 550. The ranging circuit 554 or processing circuit is configured to perform a distance determination between the vehicle 510 and the key 520 following the establishment of the communication link. In this example, ranging circuit 554 transmits a ranging signal to the vehicle 510, for example a time-of-flight challenge message, which is received by at least one of the number of UWB vehicle transceivers 516 configured to receive the ranging (challenge) signal from the key 520. In response thereto, the at least one of the number of UWB vehicle transceivers 516 transmits a response message to the ranging circuit 554 of the key 520. Upon receipt of the response message, the ranging circuit 554 passes both the ranging signal and the response message to the processor circuit 556 in order to determine whether (or not) the key 520 is located in the vicinity of the vehicle 510.

In some examples, the distance determination may use a time-of-flight measurement, for example as described with reference to FIG. 8. In some examples, this determination may be performed by the processor circuit 556, which may use a time-of-flight measurement, between the key 520 transmitting the time-discontinuous ranging signal or pulse and receiving the response message. In some examples, the key's RF circuit is only configured to wake up for a particular, and advantageously limited, period of time after sending the broadcast signal. In this manner, any acknowledgement message potentially receivable after this RF Rx wake-up time would indicate that the vehicle is too far away to consider allowing access. In some examples, a 'ranging' time-of-flight measurement may be initiated upon receiving a correct acknowledgement to the RF transmission.

In other examples, in order to obtain precise distance measurements serving as an alternative viable solution it is envisaged that a time continuous spread spectrum system (e.g. global positioning system (GPS)) or radar based system may be used.

In some examples, the distance determination may use a UWB communication link that is established in response to the key 520 receiving the acknowledgement message, in order to determine whether (or not) to allow access to the vehicle 510, whereas in other examples an alternative communication link may be used.

In accordance with some examples, the key 520 may also include a near-field communication (NFC) circuit 538, which may be in a form of an integrated circuit. The NFC circuit 538 in the key 520 may be used as an alternative to the immobilizer circuit 136 in the key 120 of FIG. 1. Both of these solutions (NFC circuit 538 and immobilizer) achieve the same purpose, e.g. they provide backup functionality, for example vehicle access and/or vehicle start, in case the key battery is empty. However, the use of an NFC circuit 538 in accordance with examples of the invention provides a simpler and less costly solution.

Thus, in accordance with examples of the invention, the PKE LF circuits of known PKE systems (such as LF antennas 118 and associated circuitry in FIG. 1) have been removed.

A skilled artisan will appreciate that the level of integration of circuits or components may be, in some instances, implementation-dependent. Clearly, the various components within the key 520 can be realized in discrete or integrated component form, with an ultimate structure therefore being an application-specific or design selection.

Figure 6:
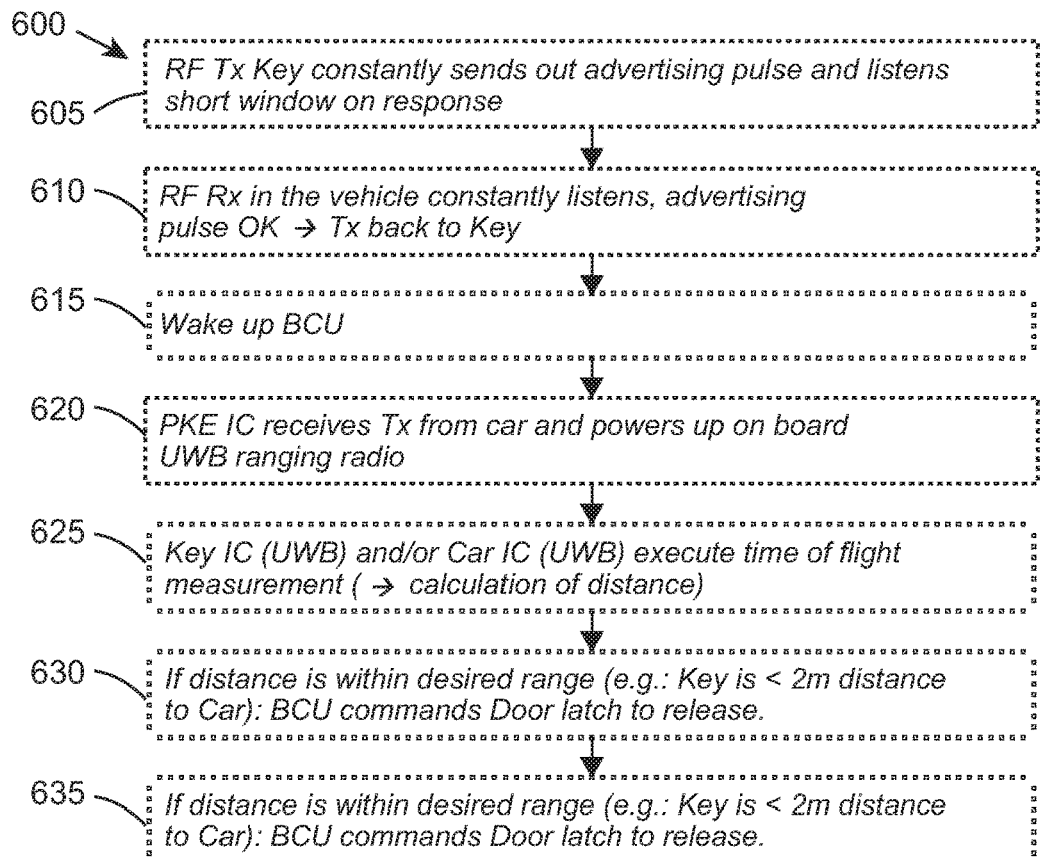
FIG. 6 illustrates a flowchart of an opening of a vehicle that employs a PKE system, according to example embodiments of the invention.

Referring now to FIG. 6, an example flowchart 600 of an opening of a vehicle that employs a PKE system, according to example embodiments of the invention, is illustrated. At 605, the RF transmitter of the Key, for example RF TRx IC 534 of key 520 of FIG. 5, is configured to regularly, or intermittently or in some cases periodically broadcast at least one signal. In some examples, the broadcast at least one signal may include sending out one or more advertising pulses, and it is configured to listen in short-window periods for an acknowledgement message from the vehicle 510. At 610, the vehicle RF receiver, for example the receiver (Rx) in RF vehicle transceiver 517 of vehicle 510 of FIG. 5, is configured to constantly listen for these advertising pulses broadcast from the key 520. If an advertising pulse is received at the vehicle 510 and the receiver (Rx) in RF vehicle transceiver 517 has determined that the received advertising pulse has been sent by an associated key 520, the vehicle 510 transmits an acknowledgement message back to the key 520 via a transmitter circuit in RF vehicle transceiver 517. In some examples, this acknowledgement message may include security and/or mutual authentication information. In this context, the 'association' between the key and the vehicle is typically a known wakeup pattern that is known by both the key and the vehicle. The 'association' is either; (i) 'learned' during vehicle production and stored in a non volatile memory) or (ii) a known secret cryptography association pattern may be applied during vehicle production or learnt by both the key and the vehicle.

At 615, a wake-up of the BCU in the vehicle 510 is performed, for example BCU 512 in FIG. 5. At 620 the PKE IC 530 in the key 520 receives the acknowledgement message transmission from the vehicle 510 and powers up the on-board UWB ranging radio circuit or function in UWB IC 550 of FIG. 5. In accordance with example embodiments, and at 625, a UWB ranging circuit 554 and/or function in UWB IC 550 of the key 520 instigates a ranging process to determine a distance between the vehicle 510 and the key 520. The ranging process includes a transmission by the UWB ranging circuit 554 and/or function in UWB IC 550 of the key 520 to the UWB communication transceivers 516 of the vehicle 510 and then back to the key 520. In some examples, the ranging process includes an execution of a time-of-flight measurement, as described in FIG. 8. Thus, in some examples, the ranging process is performed at both the key and the vehicle. In other examples, the ranging process may be performed at either the key or the vehicle, with the key optionally informing the vehicle at 630 to release the door latch. At 635, if the distance is calculated by the key 520 as being within a desired range (e.g. the key 520 is <2 m distance to vehicle 510), the BCU 512 of the vehicle commands the door latch to be released.

Figure 7:
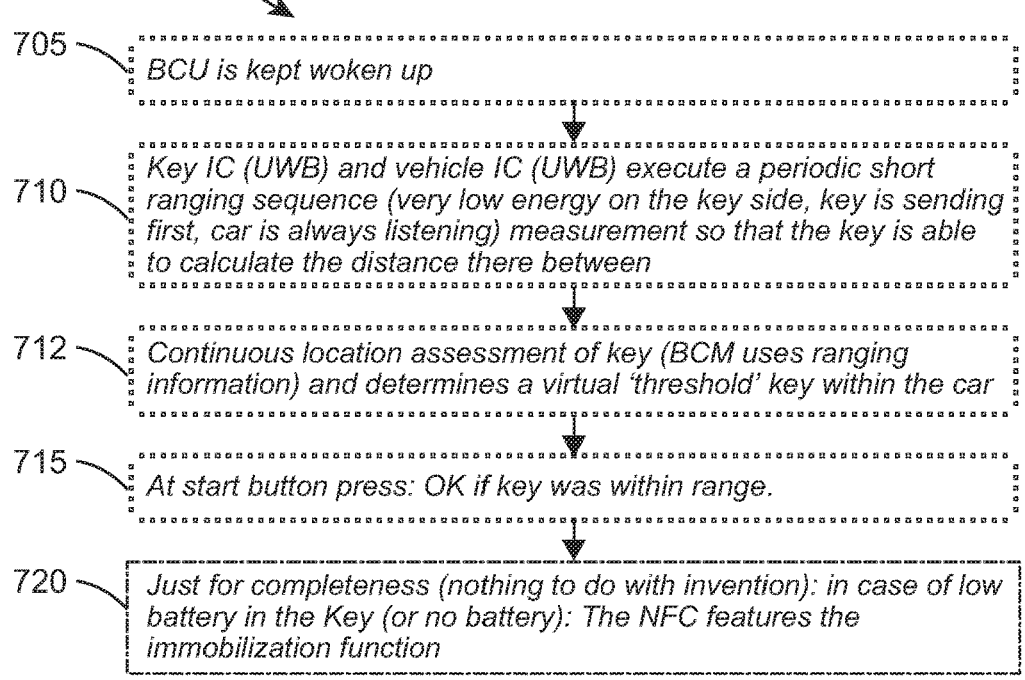
FIG. 7 illustrates a flowchart of a starting of a vehicle that employs a PKE system, according to example embodiments of the invention.

Referring now to FIG. 7, an example flowchart 700 of a remote starting of a vehicle that employs a PKE system, according to example embodiments of the invention, is illustrated. In some examples, the remote start of the vehicle is only allowed after a successful 'entry' procedure, for example as described above in FIG. 6. In this scenario, following a successful 'entry' procedure, both the vehicle and the key know the system status, and hence they are both able to change their system behaviour. At 705, the BCU in the vehicle, for example BCU 512 of FIG. 5, is woken up. At 710, the UWB functionality or the UWB IC 550 of the key 520 and the UWB functionality or the UWB IC of the vehicle 510 are configured to execute a short ranging sequence for example as illustrated in FIG. 8.

In one example, the short ranging sequence sent by the key 520 includes a periodic, regular or intermittent transmission of, say, every second or every few seconds, and thereby uses a very low energy on the key side. In some examples, the vehicle may be configured to always listen (if the vehicle's current consumption allows) or may be configured to listen in synchronized slots in order to receive a measurement transmission from its associated key 520. One advantage in using this synchronized slot approach is that it is possible to remove the additional complexity of a wakeup via the low power RF link.

Hence, in this manner, the vehicle updates the location information of the key with every ranging protocol, 712. At 715, assuming that the key 520 is now located within the vehicle, the vehicle may start following a pressing of the start button press. In some examples, at 720 and in a case of a low (or no) battery in the key 520, a near-field communication (NFC) circuit may optionally initialize the starting of the vehicle.

Figure 8:
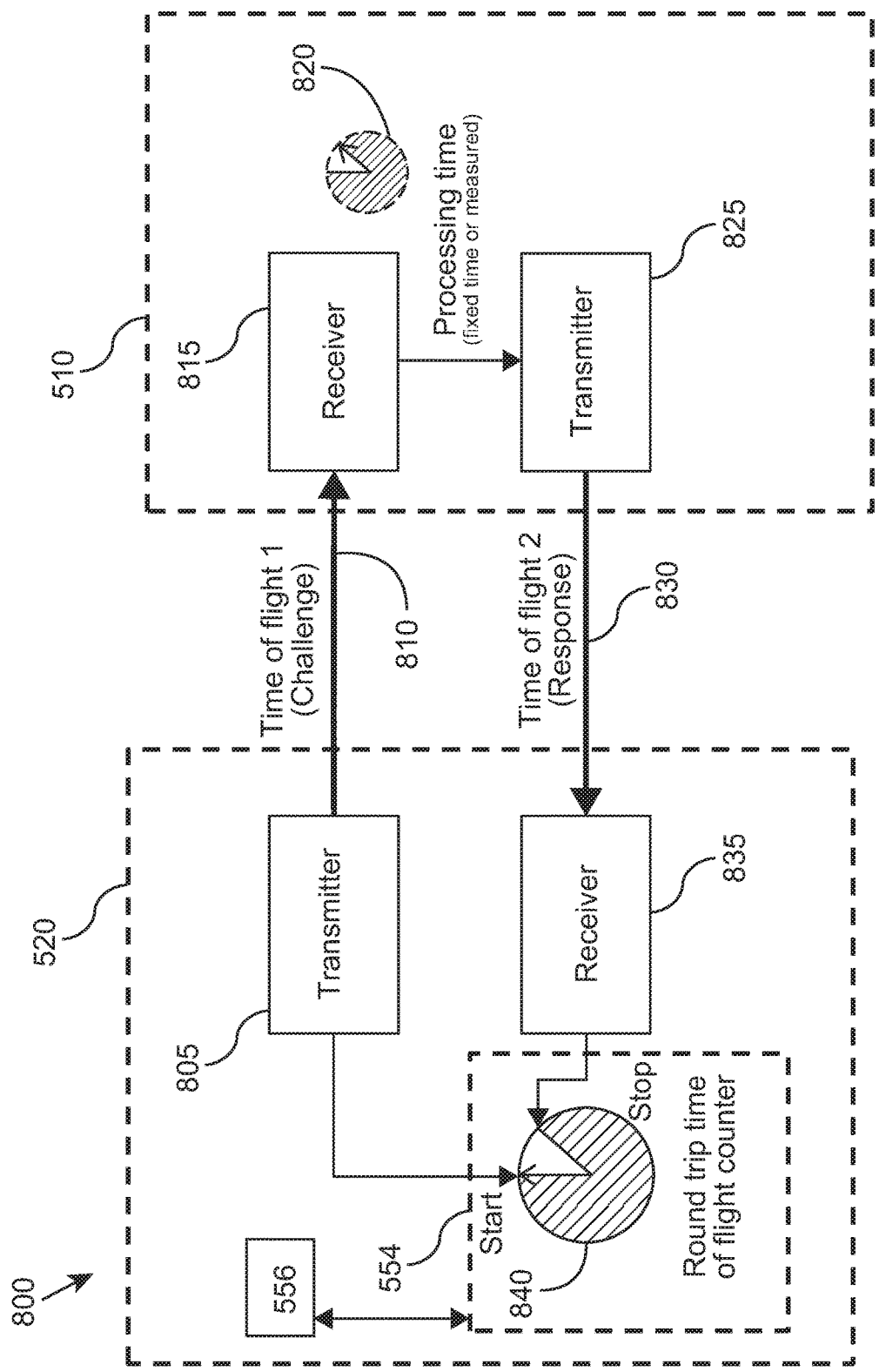
FIG. 8 illustrates a ranging process example for a key according to example embodiments of the invention.

FIG. 8 illustrates an example of a ranging process 800 for a key 520 according to example embodiments of the invention. The key 520 includes a ranging circuit, such as ranging circuit 554 of FIG. 5, configured to perform a distance determination between the vehicle 510 and the key 520. In some examples, this distance determination may be performed by either or both of the vehicle 510 and the key 520 following the establishment of a communication link between the key 520 and the vehicle 510.

In this example in FIG. 8, a two way ranging sequence is commenced with a timestamp generation 840. The ranging circuit 554 arranges for the key timer to start and a timestamp packet is transmitted, e.g. by a UWB transmitter of the key at 805, of a ranging signal to the vehicle 510, for example a time-of-flight challenge message 810. The time-stamp packet (ranging) signal is received 815 by the vehicle, for example by at least one of the number of UWB vehicle transceivers configured to receive the ranging signal (e.g. time-of-flight challenge message 810) from the key 520. In response, at the vehicle, the vehicle receive clock is started, the packet is processed, and the time of the receive clock is coded into vehicle packet. In response, the at least one of the number of UWB vehicle transceivers 516 transmits 825 a response message (e.g. time-of-flight response message 830, which may include any processing time 820 used in the vehicle from packet received to packet transmit) to a receiver, e.g. a UWB receiver 835, in the key 520. Upon receipt of the response message, the ranging circuit 554 passes the ranging signal (e.g. time-of-flight challenge message 810) and the response message (e.g. time-of-flight response message 830) to the processor circuit 556 in order to determine whether (or not) the key 520 is located in the vicinity of the vehicle 510. In this example, a time of flight measurement may be understood as being the time:

Vehicle clock−key clock=2*time of flight.

This time of flight measurement is then communicated back to the vehicle by the key.

In some examples, the ranging circuit 554 (or in some examples the processor circuit 556) may determine a 'round-trip' time 840 between the key 520 transmitting the ranging signal and receiving the response message. In some examples, the distance determination may include a processing time 820 assessment that is also used in the vehicle 510 to process the ranging signal (e.g. time-of-flight challenge message 810) and any time delay before sending the response message (e.g. time-of-flight response message 830). In some examples the ranging circuit may be implemented in both the vehicle electronics as well as in the key, whereby to enable start of a ranging protocol is enabled on both sides, i.e. the key 520 and the vehicle 510.

In an alternative example, a calibrated system with synchronized vehicle and key clocks may be used. Such systems execute a single sided ranging protocol, with only one transmission from the key 520 to the vehicle 510.

Figure 9:
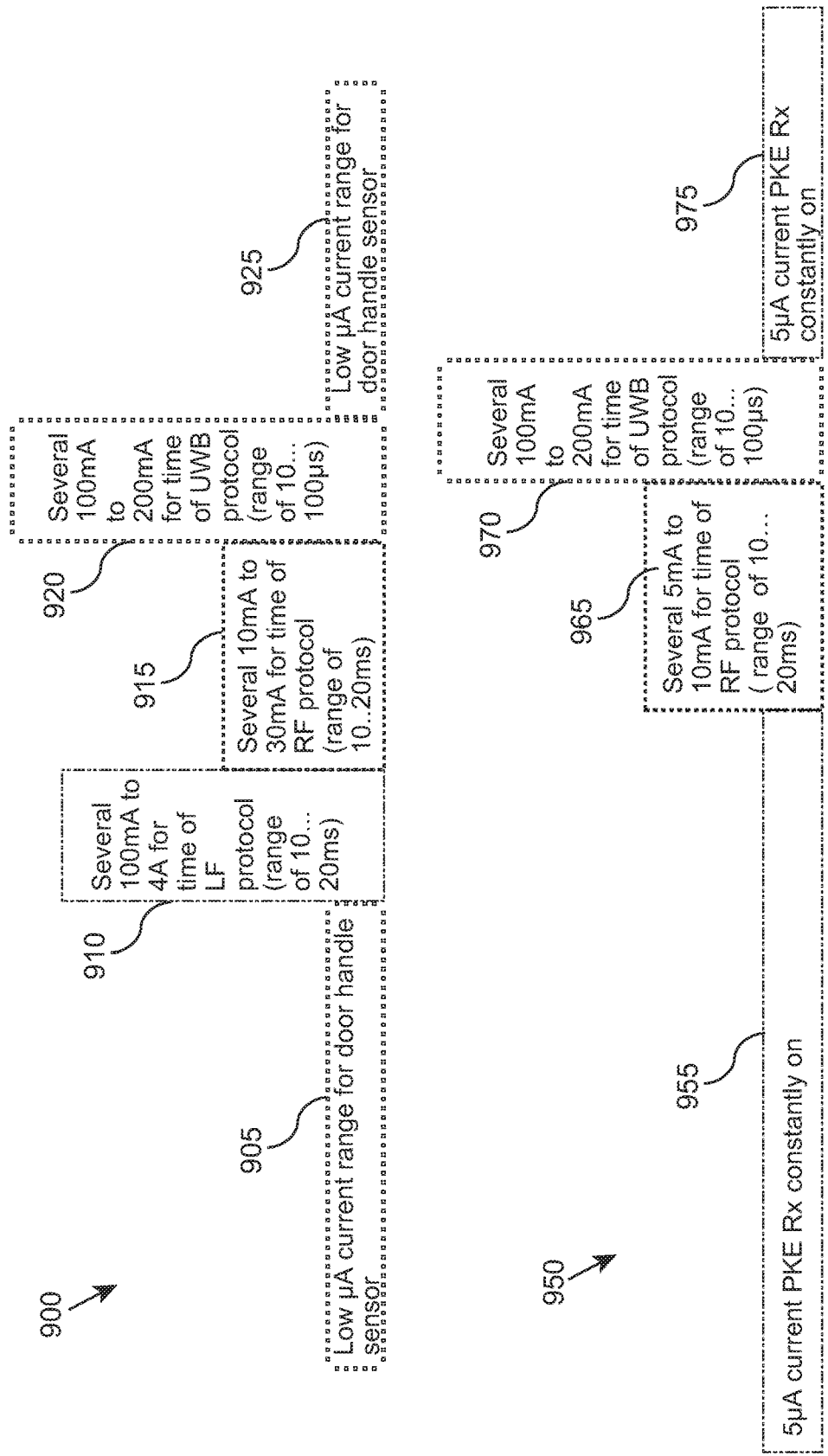
FIG. 9 illustrates an example of a current saving for a PKE system, according to example embodiments of the invention.

FIG. 9 illustrates bar-chart examples of current consumption 900 in a known PKE system as well as a current saving 950 for a PKE system, according to example embodiments of the invention. The current consumption bar charts are not shown to size, for ease of explanation. The example of current consumption 900 in a known PKE system includes a low µA current range consumed by a door handle sensor 905. Thereafter, with the LF use, several 100 mA up to, say, 4 A are consumed in 910 for a period of time due to employing the LF protocol. In known systems, this high current consumption period lasts for a range of approximately 10 to 20 msec. Thereafter, approximately 10 mA to 30 mA is consumed for a period of time 915 when using the RF protocol. In known systems, this current consumption period lasts for a range of approximately 10 to 20 msec. Thereafter, approximately 100 mA to 200 mA of current is consumed for a period for time when implementing the UWB protocol. In known systems, this current consumption period 920 lasts for a short range of approximately 10 to 100 µsec. Thereafter, the known passive keyless entry system returns to a low µA current consumption range used by the door handle sensor in 925.

In contrast, the current saving 950 for a PKE system according to example embodiments of the invention, includes for example 5 µA current being consumed whilst the PKE IC Rx, such as key 520 in FIG. 5, is constantly on in 955. Thereafter, approximately only 5 mA to 10 mA is consumed for the period of time that the RF protocol is used. In the example system, this current consumption period lasts for a range of approximately 10 to 20 msec. in 965. Thereafter, as in the known system, approximately 100 mA to 200 mA is consumed for a period of time where the UWB protocol is used, which is for a range of approximately 10 to 100 µsec, in 970. Thereafter, the PKE system according to example embodiments of the invention returns to a steady low current-consumption state of, for example, 5 µA in 975.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, in some example scenarios, the UWB IC 550 of FIG. 5 or the RF TRx IC 534 may be implemented as a collection of components and/or circuits and/or logic gates.

Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an,' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A secure vehicle access system comprising, a vehicle and a key associated with the vehicle,
wherein the key comprises:
a radio frequency, RF, key transceiver configured to:
broadcast at least one signal;
listen for an acknowledgement message from the vehicle;
an ultra-wideband (UWB) transceiver;
wherein the vehicle comprises:
an UWB transceiver;
a radio frequency, RF, vehicle transceiver configured to:
listen for the at least one broadcast signal from the key; and
in response thereto, transmit an acknowledgement message back to the key to establish a communication link between the vehicle and the key,
wherein the key further comprises a ranging circuit configured to perform a distance determination between the vehicle and the key following the establishment of the communication link to determine whether to allow access to the vehicle;
wherein the key RF transceiver is configured to continuously send advertise signal at preselected intervals and to wait for an acknowledgement from the vehicle RF transceiver, wherein prior to the distance determination and upon receiving the advertise signal from the key, the vehicle is configured to wake up the UWB transceiver of the vehicle and send an acknowledgement signal back to the key, wherein upon receiving the acknowledgement signal, the key is configured to wake up the UWB transceiver of the key.

2. The secure vehicle access system of claim 1, wherein the ranging circuit is operably coupled to the UWB key transceiver to form a second communication link with the vehicle using UWB communication to perform the distance determination.

3. The secure vehicle access system of claim 2, wherein the vehicle UWB transceiver configured to receive a ranging challenge signal from the key and transmit an acknowledgement message in response thereto.

4. The secure vehicle access system of claim 1, wherein the ranging circuit performs a time-of-flight measurement for the distance determination.

5. The secure vehicle access system of claim 4, wherein the key compares the time-of-flight measurement with a threshold in order to determine whether to allow access to the vehicle.

6. The secure vehicle access system of claim 1, wherein the broadcast signal comprises at least one broadcast advertising pulse.

7. The secure vehicle access system of claim 1, wherein the broadcast signal is transmitted from the key in a time-discontinuous manner, comprising regular, intermittent or periodic transmissions.

8. The secure vehicle access system of claim 1, wherein the vehicle comprises a body control unit, BCU, configured to wake up in response to a received broadcast signal from an associated key.

9. The secure vehicle access system of claim 1, wherein the acknowledgement message includes at least one of: security information, mutual authentication information.

10. The secure vehicle access system of claim 1, wherein the key further comprises a near-field communication, NFC, circuit configured to provide a battery-less backup to initiate vehicle start in case of a low key battery.

11. A key associated with a vehicle for use in a secure vehicle access system, the key comprising:
an ultra-wideband (UWB) transceiver;
a radio frequency (RF) key transceiver configured to:
broadcast at least one signal; and
listen for an acknowledgement message from the vehicle, wherein a communication link is established between the vehicle and the key upon receipt of the acknowledgement message from the vehicle; and
a ranging circuit configured to perform a distance determination between the vehicle and the key following the establishment of the communication link to determine whether to allow access to the vehicle,
wherein the RF key transceiver is configured to continuously send advertise signal at preselected intervals and to wait for an acknowledgement from the vehicle prior to waking up the UWB transceiver to perform the distance determination.

12. The key of claim 10, wherein the ranging circuit is operably coupled to the UWB key transceiver to form a second communication link with the vehicle using UWB communication to perform the distance determination.

13. The key of claim 10, wherein the broadcast signal is transmitted from the key in a time-discontinuous manner, comprising at least one of: regular transmissions, intermittent transmissions, periodic transmissions.

14. A vehicle for use in a secure vehicle access system, the vehicle comprising,
a radio frequency (RF) vehicle transceiver configured to:
listen for the at least one broadcast signal from a key associated with the vehicle; and
in response thereto, transmit an acknowledgement message back to the key to establish a communication link between the vehicle and the key,
a number of ultra-wideband (UWB) vehicle transceivers coupled to the RF vehicle transceiver and configured to:

receive a ranging challenge signal from the key in response to the establishment of the communication link; and transmit a response message to the key; and a body control unit (BCU) coupled to the RF vehicle transceiver and configured to wake up in response to the received at least one broadcast signal from an associated key and receive an instruction from the key as to whether to allow access to the vehicle based on the response message to the key.

15. A method for a secure vehicle access system comprising, a vehicle and a key associated with the vehicle, the method comprising:

continuously broadcasting, by the key, at least one signal radio frequency (RF) and listening, at the vehicle, for the at least one broadcast RF signal and in response thereto, transmitting an acknowledgement message back to the key;

receiving, at the key, the acknowledgement message;

establishing a communication link between the vehicle and the key in response to the received acknowledgement message and waking up an ultra-wideband transceiver of the key and an ultra-wideband transceiver of the vehicle;

using the ultra-wideband transceiver of the key, performing at the key a distance determination between the vehicle and the key following the establishment of the communication link; and determining at the key whether to allow access to the vehicle.

* * * * *